G. M. GITHENS.
Steam Rock-Drill.
No. 228,056. Patented May 25, 1880.
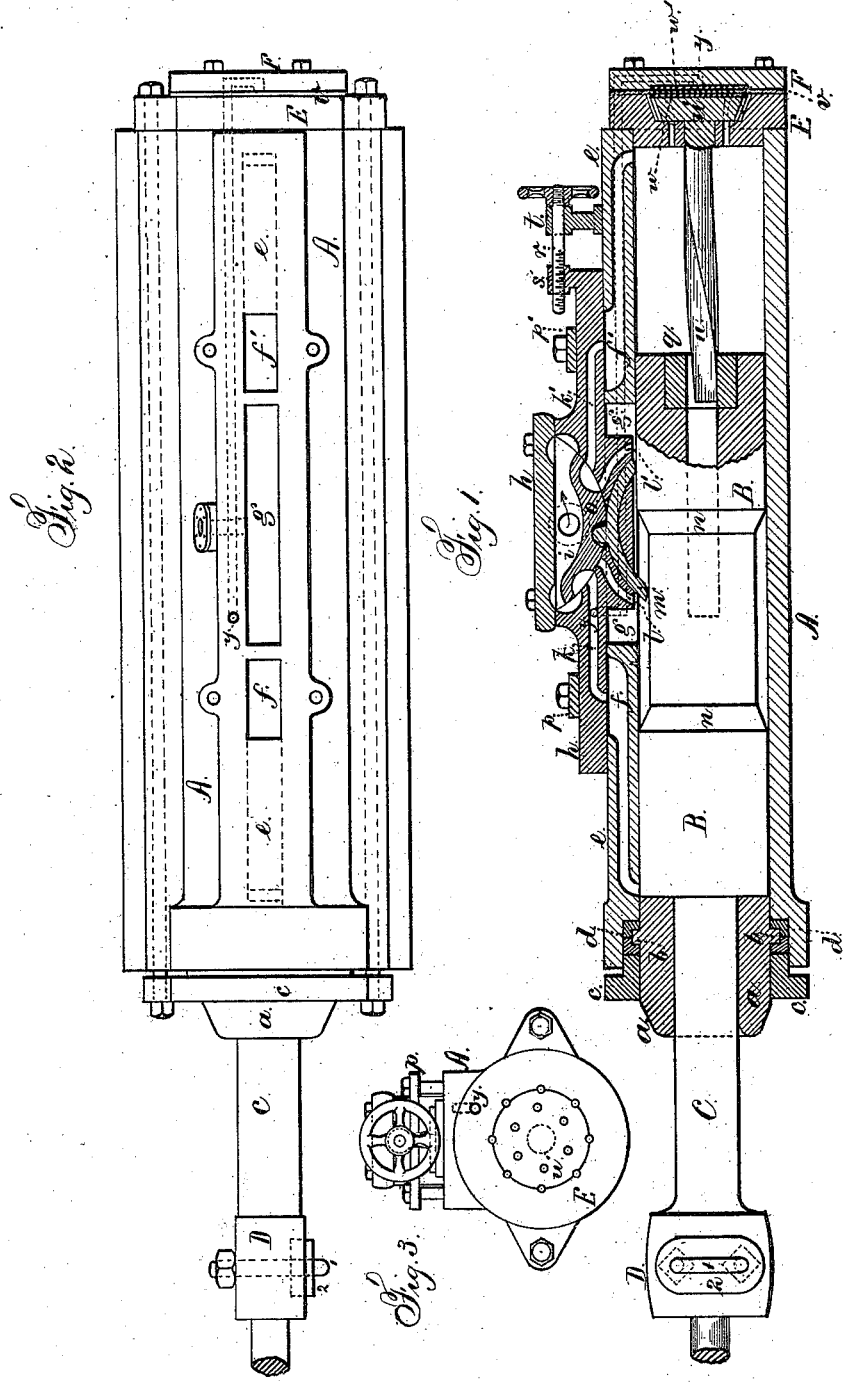
Witnesses
Harold Serrell
Chas H. Smith
Inventor
George M. Githens
per Lemuel W. Serrell
atty.
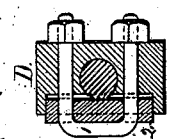

UNITED STATES PATENT OFFICE.

GEORGE M. GITHENS, OF BROOKLYN, E. D., NEW YORK.

STEAM ROCK-DRILL.

SPECIFICATION forming part of Letters Patent No. 228,056, dated May 25, 1880.

Application filed July 14, 1879.

*To all whom it may concern:*

Be it known that I, GEORGE M. GITHENS, of Brooklyn, E. D., in the county of Kings and State of New York, have invented a new and useful Improvement in Steam Rock-Drills; and the following is declared to be an exact description of the same.

The object of my invention is to furnish a rock-drilling machine that will be uniform and reliable in its action and can easily be adapted to the varying and disadvantageous conditions under which the same is employed.

In the drawings, Figure 1 is a longitudinal section of my improved rock-drill. Fig. 2 is a plan of the same with the valve-chest removed. Fig. 3 is an end view with the outside cylinder-head removed, and Fig. 4 is a section of the drill-stock and clamp shown by elevation in Fig. 1.

My rock-drill is constructed, in the usual way, with a cylinder, piston, piston-rod, and drill-holding device; and my improvements relate to the special features of construction of the different parts, whereby I produce a machine more uniform and reliable than heretofore.

Difficulty has been experienced in rock-drills from the liability of injuring the front end of the cylinder by concussion on the inside from the piston or on the outside from the drill-clamp, as will be more fully described hereinafter.

A is the steam-cylinder, B the piston, and C the piston-rod, around which is the ring or head $a$, and on the exterior surface of the same is a collar, $b$. There is a cap, $c$, securely bolted to the cylinder A, and which fits into the counterbored end of said cylinder, and there is a space behind the cap, into which the collar $b$ of the head is received, and the remaining space between the parts is filled with a ring or rings, $d$, of suitable yielding material. As the force of the blow from the piston or drill-stock is received on either side of the head $a$, it acts to force said head either one way or the other, thereby displacing the ring or rings of yielding material from one side to the other, or vice versa, according to which end of the head $a$ receives the blow. By this construction the force of the blow is undiminished, because the piston and drill can move the full stroke, and the lead rings $d$ prevent injury to the parts, because they yield slightly, sometimes not more than the hundredth part of an inch, and relieve the blow when the iron or steel parts strike together. In cases where india-rubber or other elastic material is employed to take the concussion the drill is gradually stopped while moving the last inch or more of its stroke; hence it does not exert its whole force, but is almost stopped before the drill-point strikes the rock; otherwise the rubber would not have acquired the necessary resistance to stop the momentum at the desired point.

On the end of the rod C is the drill-stock D, having a socket for holding the drill and a U-shaped bolt, 1, for clamping the reversible cap-plate 2 against the drill, as shown in Fig. 4. In use the pressure from the U-shaped bolt will, after a while, bend the center of the cap 2 over the drill, causing the edges to come in contact with the drill-stock D, and then the drill becomes loose, and the cap, no longer holding the drill, would be useless; but as it is reversible it can be turned upside down and the parts clamped securely together, as before.

Upon the outer surface of the cylinder A, and extending nearly its whole length, there is a plane surface or seat, $e$, and in this surface are two openings or steam-ports, $f\,f'$, and the exhaust-ports $g$.

The valve-chest $h$ is made with a central space, $i$, into which the steam enters; also the steam-ports $k\,k'$ and exhaust-ports $l\,l'$. The lower part of the valve-chest descends into and partially fills up the exhaust-port $g$, and said lower part is channeled out on a curve to receive the circular sliding-valve driver $m$, which is operated by the piston B, which is smaller in the center, and has the inclines $n$, which, with the forward-and-backward movement of the piston B, moves said valve-driver $m$ over from one side to the other. This valve-driver $m$ has a projection on its upper side, that fits into a recess in the sliding circular valve $o$, which valve is made with cavities, forming ports or passages, which, in the forward-and-backward movement of the valve, open or close alternately the steam-ports $k\,k'$.

I do not limit myself to the circular sliding valve $m$, as a flat valve may be used to equal advantage.

The valve-chest $h$ is flat on its under side, and capable of a sliding motion on the plane surface $e$ of the cylinder A, and it is held down securely to place by the cross-pieces or binding-straps $p\ p'$, which are bolted to the cylinder, and said valve-chest is adjustable lengthwise of the cylinder by means of the screw-rod $r$, working through the bearings $s\ t$, the bearing $s$ being secured to the valve-chest and the bearing $t$ to the cylinder. By adjusting this valve-chest the valve and valve-driver can be placed exactly midway of the cylinder lengthwise, or nearer to one end than the other.

When the drill is being operated downwardly the weight of the piston and drill has to be lifted, and the steam should be admitted when the piston is farther away from the front head than it should be when the piston and drill are worked upwardly, and the weight has to be projected upwardly. This adjustment of the valve-chest allows the steam to be admitted sooner or later in the stroke either way, to render the movement uniform.

In one end of the piston B there is an opening and a nut, $q$, which is made of a size to receive the twisted rod $u$, and this rod $u$ has a head, $u'$, the beveled edge of which fits into a corresponding recess in the head E of the cylinder A. Between this head E and the outer head, F, there is a space, which is occupied by the diaphragm $v$, which may be made of rubber, leather, or other suitable material, and at each side of said diaphragm there are metal disks $w\ w'$.

There is a steam-port, $y$, opening from the port $k$ and passing along in the metal side of the cylinder A, as shown by dotted lines in Fig. 1, and said port $y$ extends to the recess in the head F, in which is the metal disk $w'$ on one side of the diaphragm.

The operation of the parts is as follows: When steam is applied from the space $i$, through ports $k$ and $f$ against the piston B in the position shown in the drawings, said piston is driven back. At the same time steam is admitted from the port $k$ into the port $y$, and, passing back into the head F, operates against the metal disks $w\ w'$ and diaphragm $v$, and holds the head $u'$ of the rod $u$ down firmly against its seat, so that it cannot turn. Hence as the piston is driven back over the spiral rod $u$ it receives a rotary movement; but as the piston is driven the other way by steam entering through the ports $k'\ f'$ the steam in the port $y$ goes to exhaust, relieving the pressure on the diaphragm, and the rod $u$ and head $u'$ are free to revolve as the piston B moves along without revolving; but the twisted rod and its head are revolved by the piston.

I provide openings in the head $u'$ of rod $u$, and between the friction-surfaces of head $u'$ and head E, in order that the steam, when in this end of the cylinder, is free to pass all around the head of the rod $u$ and cause it to turn freely, and if there is any sand or gritty substances in the cylinder the same does not interfere with the operation of the twisted rod and head, because such foreign substances work into these holes and are retained therein out of the way.

The head E may be dispensed with in small machines, in which case the friction-head of the twisted rod will be made larger and have its seat on the end of the cylinder.

I claim as my invention—

1. The cylinder A and piston B, constructed as shown, in combination with the circular sliding-valve driver $m$ and valve $o$, steam-ports $k\ k'$ and $f\ f'$, and exhaust-port $g$, the parts operating substantially in the manner and for the purposes set forth.

2. The piston B, twisted rod $u$, and head $u'$, in combination with the heads E F, diaphragm $v$, disks $w\ w'$, and steam-port $y$, the parts being constructed and operating substantially in the manner and for the purposes set forth.

3. The combination, with the twisted rod $u$, of a friction-head, $u'$, diaphragm $v$, and cylinder-head E F, the same having a space for steam to act upon the diaphragm, for the purposes substantially as set forth.

4. The combination, with the twisted rod $u$ and head E, of a friction-head, $u'$, having openings through the same, and a diaphragm, $v$, as and for the purposes set forth.

5. The combination, with the twisted rod, of a friction-head, $u'$, diaphragm $v$, and disks $w$ and $w'$, one at each side of said diaphragm, substantially as and for the purposes set forth.

6. The adjustable valve-chest $h$, having the steam-space $i$, ports $k\ k'$ and $l\ l'$, valve $o$, and valve-driver $m$, and held to place by binding-straps $p\ p'$, in combination with the adjusting screw-rod $r$ and bearings $s$ and $t$, the parts being constructed and operating substantially in the manner and for the purposes set forth.

7. The cylinder A, piston B, and piston-rod C, in combination with the ring or head $a$ around the piston-rod, the collar $b$ on the outside of such ring or head, and the ring or rings $d$, of yielding material, substantially as shown, around the collar $b$ and within cap $c$, as set forth.

8. The combination, with the piston-rod C, drill-stock D, and drill, of the reversible cap 2 and U-shaped bolt 1, the parts being constructed and operating substantially as and for the purposes set forth.

Signed by me this 2d day of July, A. D. 1879.

GEO. M. GITHENS.

Witnesses:
WILLIAM G. MOTT,
HAROLD SERRELL.